Jan. 17, 1933.   G. F. CHISHOLM   1,894,439
ADJUSTABLE AND COLLAPSIBLE WHEEL CHOCK
Filed Feb. 11, 1931   2 Sheets-Sheet 1

INVENTOR
GEORGE F. CHISHOLM
BY A.B.Bowman
ATTORNEY

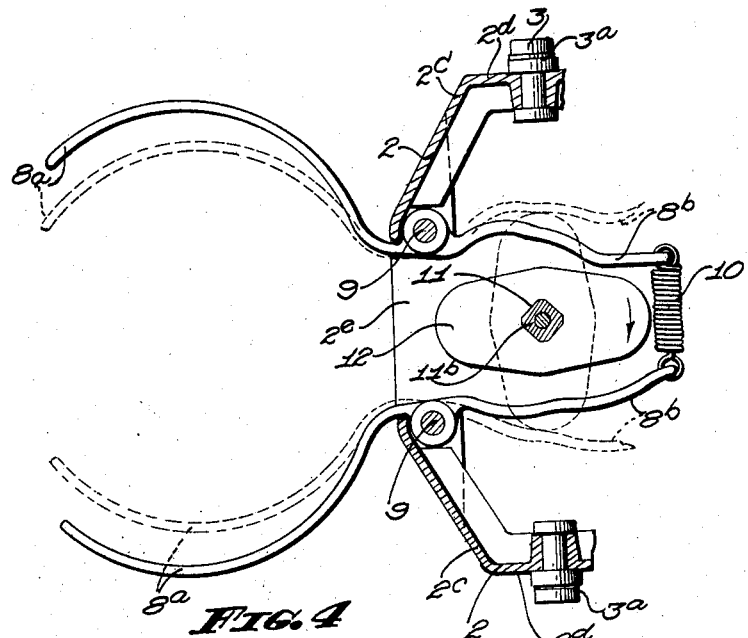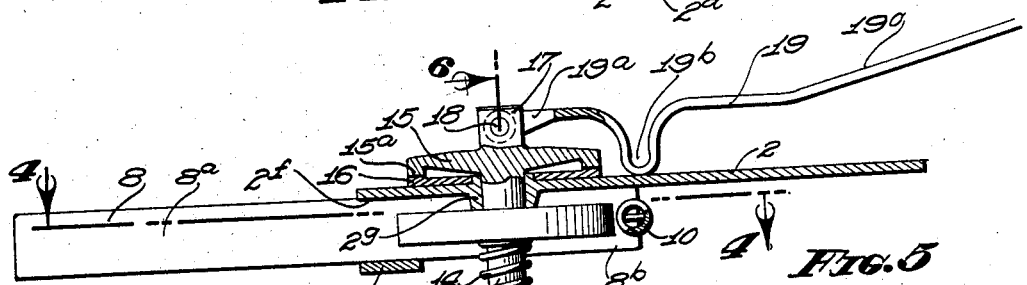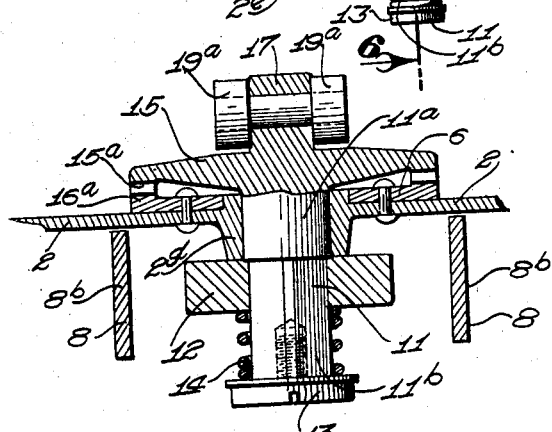

Patented Jan. 17, 1933

1,894,439

UNITED STATES PATENT OFFICE

GEORGE F. CHISHOLM, OF SAN DIEGO, CALIFORNIA

ADJUSTABLE AND COLLAPSIBLE WHEEL CHOCK

Application filed February 11, 1931. Serial No. 515,036.

My invention relates to adjustable and collapsible wheel chocks and the objects of my invention are:

First, to provide a chock of this class, which is particularly adapted for holding the wheels of airplanes while the engine is being warmed up or at other times when it is desirable to prevent movement of the airplane, but is equally useful for holding the wheels of any vehicle.

Second, to provide a chock of this class, which is light and compact, yet sturdy of construction, and eliminates the use of clumsy wooden blocks for such purposes.

Third, to provide a chock which grips the tire or other suitable portions of the airplane wheel so that vibration or oscillating movement of the airplane cannot cause the chock to creep away from the wheel or otherwise work loose.

Fourth, to provide a chock which cannot be thrown backwards by the air blast created when an airplane begins to taxi, thereby providing a chock which is especially desirable where there may be danger of injury from a backwardly thrown chock.

Fifth, to provide a chock which cannot accidently work loose but may be quickly and easily released and removed when desired.

Sixth, to provide a chock which is capable of standing hard use and abuse.

Seventh, to provide a chock which may be readily collapsed for storage or transportation, and Eighth, to provide on the whole a novelly constructed collapsible and adjustable chock which is durable, efficient in its action, and which will not deteriorate or get out of order.

Figure 1:
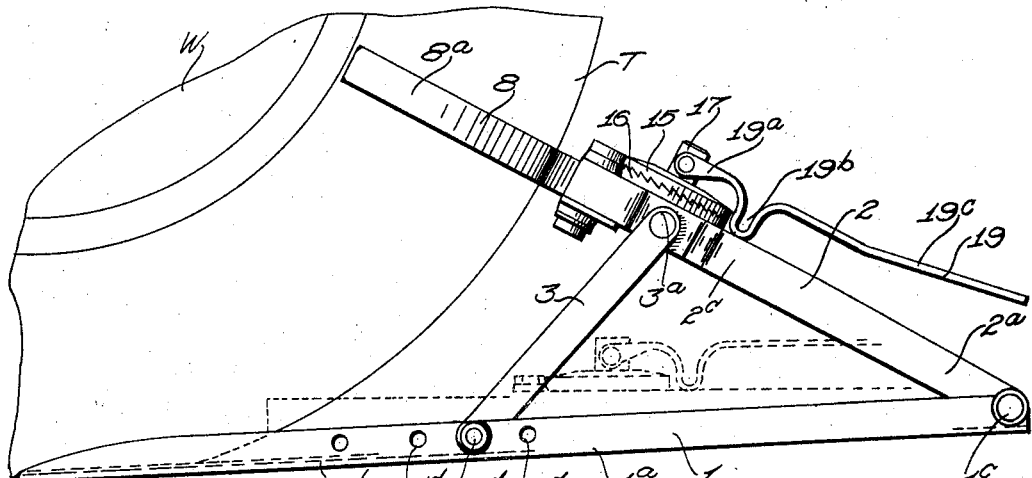
Figure 2:
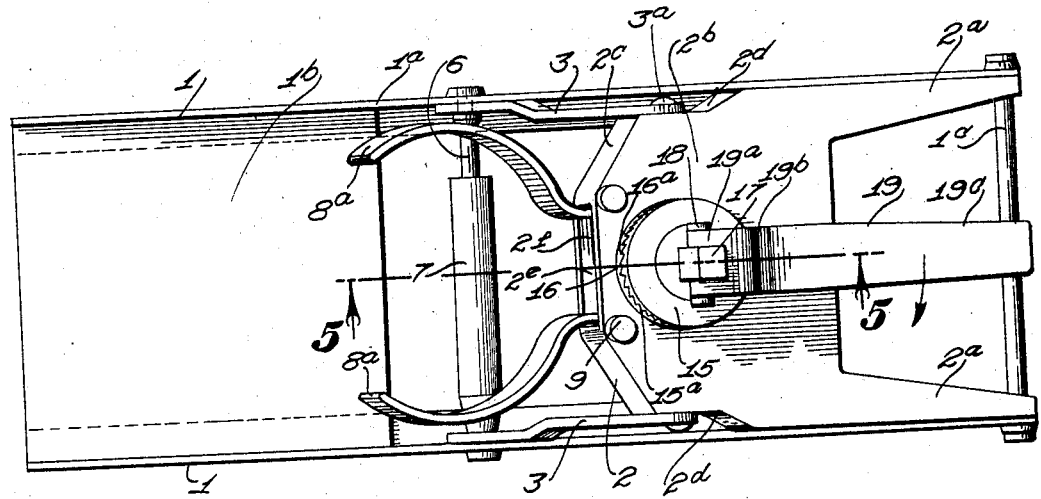
Figure 3:
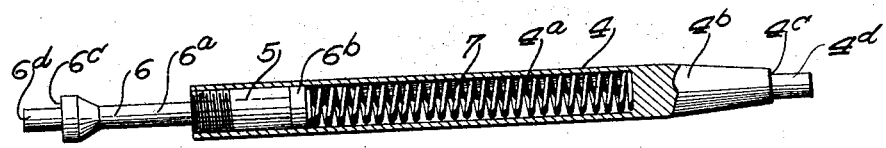

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my novel collapsible wheel chock positioned for use with the clamping jaws in their open position; Fig. 2 is a plan view thereof; Fig. 3 is a longitudinal sectional view through the locking bar with parts and portions as shown in elevation to facilitate the illustration; Fig. 4 is an enlarged fragmentary sectional view substantially through 4—4 of Fig. 5, with parts and portions as shown in elevation; Fig. 5 is a fragmentary sectional view substantially through 5—5 of Fig. 2; Fig. 6 is an enlarged fragmentary transverse sectional view through 6—6 of Fig. 5.

Similar characters of reference refer to similar parts and portions throughout the several views of the drawings.

Base frame 1, bracket member 2, braces 3, locking bar casing 4, locking bar sleeve 5, locking bar pin 6, locking bar spring 7, clamp levers 8, journals 9, spring 10, shaft 11, cam rider 12, end screw 13, spring 14, upper ratchet member 15, lower ratchet member 16, boss 17, pin 18 and handle member 19 constitute the principal parts and portions of my novel adjustable and collapsible wheel chock.

The base frame 1 comprises a pair of side members 1a, preferably formed of angle iron. At their forward portions, the side members are connected together by a relatively wide web forming a floor 1b. The bracket member 2 comprises a pair of arm members 2a of angular cross section. These arm members are hinged to the rear portions of the side members 1a by a hinge pin 1c which may also form a spacing means for the side members 1a.

The portions of the arm members 2a extended from the pin 1c are joined together by their upper sides by a plate portion 2b. The plate portion 2b is bordered by rims 2c along its outer sides and extended end which continue from the arm members 2a. Near its extended end, the sides of the plate portion 2b are offset inwardly forming offset portions 2d.

Joined to the bracket member 2, at the offset portions 2d, by means of suitable journals 3a, are a pair of braces 3, which extend downwardly and forwardly from each side of the plate portion to points inside of and adjacent the vertical walls of the side members 1a as shown in Figs. 1 and 2. At their lower ends, the braces 3 are provided with openings therethrough which are adapted to aline with pairs of openings or holes 1d provided in the vertical walls of the side members 1a. When so alined, they receive the ends of a locking bar structure.

The locking bar structure includes a locking bar casing 4 having a tubular portion 4a. One end of the tubular portion 4a is closed by a solid end portion 4b which tapers slightly and forms a shoulder 4c near its extremities. Continuing from the shoulder, a locking stub 4d is formed. The other end of the tubular portion 4a is closed by a locking bar sleeve 5, having a bore therethrough which is adapted to receive the shank portion 6a of a locking bar pin 6. The inner end 6b of the locking bar pin 6 is enlarged. A spring extends between the inner end 6b of the locking bar pin 6 and the inner end of the tubular portion 4a so as to yieldably hold the locking bar pin in an extended position. Near its extended end, the locking bar pin 6 is provided with a shoulder 6c. Continuing from the shoulder 6c, is a locking stub 6d.

The locking stubs 4d and 6d are adapted to extend through the holes in the braces 3 and into opposite pairs of holes 1d in the frame 1. By inward movement of the locking bar pin 6 with respect to the locking bar casing 4, the locking stubs 4d and 6d may be withdrawn thereby permitting the bracket member 2 to collapse to the dotted line position shown in Fig. 1.

The rims 2c at the extended end of the plate portions 2b terminate in spaced relation to each other but are joined together by a cross member 2e extending between their lower edges forming a slot 2f which is substantially centered between the side margins of the bracket member.

A pair of clamp levers 8 are provided. These clamp levers 8 are supported intermediate their ends on journals 9. These journals extend between the cross portion 2e and the plate portion 2b, adjacent the ends of the rims 2c, bordering the slot 2f as shown best in Fig. 4. Extending outwardly from the bracket member 2 are clamping arms 8a which are arcuate and adapted to extend around opposite sides of a tire, as shown best in Fig. 1. The arms of the clamp lever 8, which extend underneath the plate portion 2b from cam arms 8b and are connected together at their extremities by a spring 10.

Formed in the plate portion 2b and extending downwardly therefrom between the cam arms 8b is a bearing 2g as shown best in Figs. 5 and 6. Journalled in the bearing 2g by a journal portion 11a is a shaft 11. Below the journal portion 11a, the shaft 11 is provided with a polygonal portion 11b which is adapted to slidably receive a cam rider 12. The cam rider 12 is slightly elongated and round-ended. The polygonal portion 11b extends below the cam rider 12 and is provided with an end screw 13. A spring 14 extends between the end screw 13 and the cam rider 12 as shown in Figs. 5 and 6.

The journal portion 11a of the shaft 11 extends above the plate portion 2b and is provided with an upper ratchet member 15, which may be formed integral therewith. The ratchet member 15 is in the form of an annular disk and is provided with teeth 15a at the under side of its peripheral portion.

These teeth are adapted to engage corresponding ratchet teeth 16a of a lower ratchet member 16. The lower ratchet member 16 is annular with an opening in the center and is secured to the plate portion 2b.

A boss 17 substantially centered with respect to the shaft 11 extends above the upper ratchet member 15 and receives a transversely extending pin 18. Journaled on the extended end of the pin 18 is a bifurcated end 19a of a handle member 19. The handle 19 is provided with a downwardly extending portion 19b which forms a fulcrum point therefor. This portion is arranged as close to the bifurcated end 19a as possible. The remaining portion of the handle member 19 forms a grip portion 19c.

Operation of my adjustable and collapsible wheel chock is as follows:

The chock is transported and handled in its collapsed position shown by dotted lines in Fig. 1. The chock may be locked in its collapsed position by extending the braces 3 until opposite the openings 1d at the extreme left of the group of openings viewed in Fig. 1, then positioning the locking bar structure.

In adjusting the chock for use, the locking bar is removed from the above-described pair of holes 1d and the bracket 2 is raised until a plane therethrough would pass substantially through the center of a wheel when the chock is in the position relative thereto shown in Fig. 1. The locking bar is then repositioned securing the ends of the braces 3 so as to rigidly support the bracket 2. When in this position, the floor 1b of the chock is slipped as far under the tire T of the wheel W as possible.

The positions of the clamping arms 8a with respect to the floor 1b, are such that when the floor is inserted as far as possible beneath the wheel, the clamp arms pass around opposite sides of the tire thereof as shown in Fig. 1. When the clamping arms are spread, there is sufficient space therebetween to receive the tire. After the clamping arms are on opposite sides of the tire, the handle 19 is rotated clockwise as viewed from the top and indicated by the arrows in the several views, causing the cam rider 12 to engage the cam arms 8b, and forcing the clamping arms 8a inwardly against the sides of the tire. The cam portions of the cam arms 8b are so arranged that although one arm is engaged closer to its fulcrum point than the other, the inward movement of the arms 8a for each degree of movement of the cam rider is approximately the same.

It is of course obvious that the functions of the cam rider and cam arms may be reversed. That is the rider may be shaped to form a cam which causes the desired equal movement of the clamping arms 8a, although the cam arms 8b should be identical in construction. The above arrangement referred to is particularly suitable should it be desired to make the arms 8b slightly yieldable. In either case, it is desired to have the clamping arms 8a slightly yieldable.

The teeth of the ratchet members 15 and 16 are so arranged that they do not engage when the lever 19 is turned clockwise but prevent return movement thereof, thus the arms firmly hold the tire without danger of accidental release.

When it is desired to release the clamping arms, the grip portion 19c of the handle member is forced downwardly so that the downward extension 19b bears against the plate portion 2b and acts as a fulcrum for raising the upper ratchet member 15 and shaft 11 against the action of the spring 14. When the ratchet member 15 is so raised, the handle member 19 is turned while pressing downwardly thereupon so that the fulcrum portion 19b rides upon the surface of the plate 2b.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a wheel chock, a base member, a bracket hinged to said base member, said bracket shiftable from a collapsed position adjacent to said base member to one of several extended positions of angular relation therewith, braces for supporting said bracket in its various positions relative to said base member, means for locking said bracket in any of its various positions, and a wheel clamping mechanism associated with said bracket.

2. In a wheel chock, a base member, a bracket hinged to said base member, said bracket shiftable from a collapsed position adjacent to said base member to one of several extended positions of angular relation therewith, braces for supporting said bracket in its various positions relative to said base member, and a wheel clamping mechanism associated with said bracket.

3. In a wheel chock, a base member, a bracket disposed in angular relation with said base member, and a wheel clamping mechanism associated with said bracket, said wheel clamping mechanism including a pair of clamping levers, cam means for operating said levers, a handle associated with said cam means, and means for locking said levers in their clamping positions.

4. In a wheel chock, a base member including a floor portion adapted to be wedged between a wheel and a surface supporting the same, a bracket disposed in angular relation with said base member, and a wheel clamping mechanism associated with said bracket, said wheel clamping mechanism including a pair of clamping levers, cam means for operating said levers, a handle associated with said cam means, and means for locking said levers in their clamping positions.

5. In a wheel chock, a base member, a bracket hinged to said base member, said bracket shiftable from a collapsed position adjacent to said base member to one of several extended positions of angular relation therewith, braces for supporting said bracket in its various positions relative to said base member, means for locking said bracket in any of its various positions, and a wheel clamping mechanism associated with said bracket, said wheel clamping mechanism including a pair of clamping levers, cam means for operating said levers, a handle associated with said cam means, and means for locking said levers in their clamping positions.

6. In a wheel chock, a base member, a bracket disposed in angular relation with said base member, and a wheel clamping mechanism associated with said bracket, said wheel clamping mechanism including a pair of clamping levers projecting from said bracket arranged to extend around opposite sides of a tire, cam means for shifting said levers to their clamping positions, yieldable means tending to release said levers, locking means for retaining said levers in their clamping positions, and a handle associated with said cam and yieldable means whereby movement of said handle in one direction actuates said cam, and movement of said handle in another direction disengages said locking means.

7. In a wheel chock, a base member, a bracket hinged to said base member, said bracket shiftable from a collapsed position adjacent to said base member to one of several extended positions of angular relation therewith, braces for supporting said bracket in its various positions relative to said base member, means for locking said bracket in any of its various positions, and a wheel clamping mechanism associated with said bracket, said wheel clamping mechanism including a pair of clamping levers projecting from said bracket arranged to extend around opposite sides of a tire, cam means for shifting said levers to their clamping positions, yieldable means tending to release said levers, locking means for retaining said levers in their clamping positions, and a handle associated with said cam and yieldable means whereby movement of said handle in one direction actuates said cam, and movement of said handle in another direction disengages said locking means.

8. In a wheel chock, a base member including a floor portion adapted to be wedged between a wheel and a surface supporting the same, a bracket hinged to said base member, said bracket shiftable from a collapsed position adjacent to said base member to an angular relation therewith, braces for supporting said bracket in various positions relative to said base member, and a wheel clamping mechanism associated with said bracket.

In testimony whereof, I have hereunto set my hand at San Diego, California, this 31st day of January 1931.

GEORGE F. CHISHOLM.